Aug. 10, 1937.  G. A. LYON  2,089,389
ORNAMENTAL SNAP-ON MEMBER
Original Filed Aug. 19, 1933
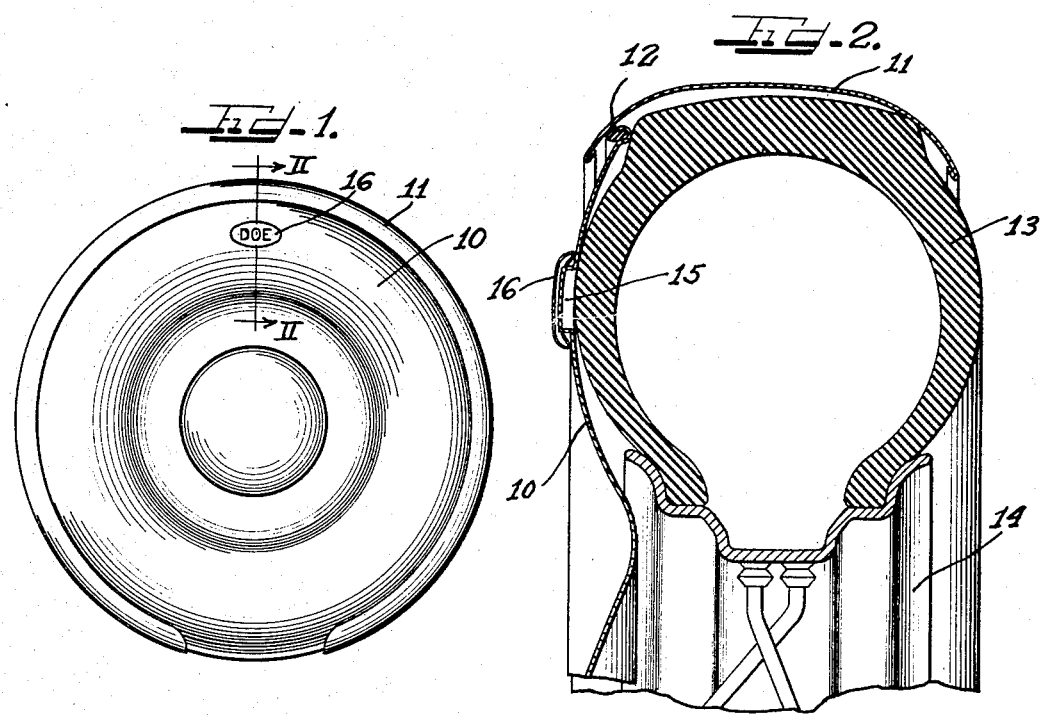
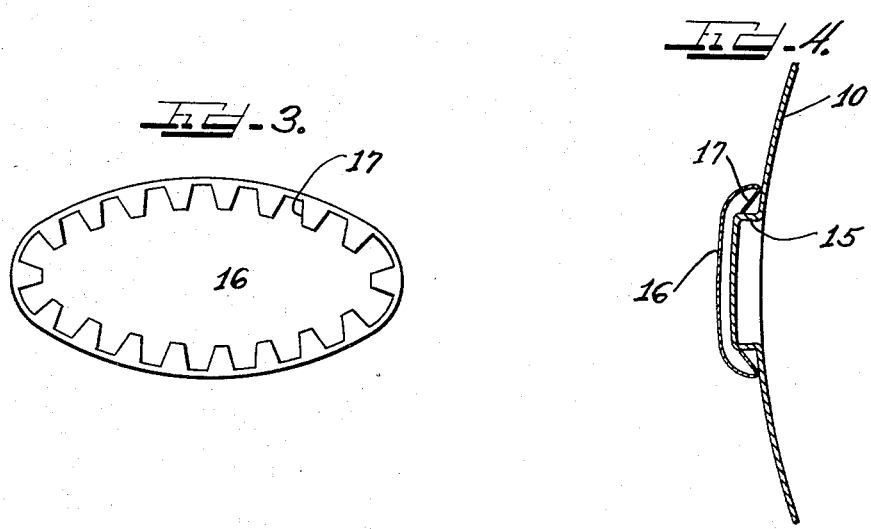
Inventor
George Albert Lyon.
by Charles O'Neill Attys.

Patented Aug. 10, 1937

2,089,389

UNITED STATES PATENT OFFICE 2,089,389

ORNAMENTAL SNAP-ON MEMBER

George Albert Lyon, Detroit, Mich., assignor to Lyon Incorporated, Detroit, Mich., a corporation of Delaware Original application August 19, 1933, Serial No. 685,838, Patent No. 2,022,128. Divided and this application July 22, 1935, Serial No. 32,503

1 Claim. (Cl. 41—34)

This invention relates to an ornamental snap-on member, and more particularly to an arcuate or circular cap having concealed resilient means arranged so that the cap may be self-retained on a given object.

The subject matter of this application has been divided from my copending application, Serial No. 685,838, filed August 19, 1933, entitled "Ornamental member for wheels", now issued as Letters Patent No. 2,022,128.

An object of this invention is to provide an improved ornamental arcuate or circular cap-like member adapted to be snapped readily into retained engagement with the object to be covered.

Another object of the invention relates to the provision of an improved arcuate or circular ornamental member having concealed resilient means for causing the member to be self-retained on a given object.

A still further object of the invention is the provision of an ornamental member of the aforesaid character wherein the retaining means is so disposed that any tendency to dislodge the member from the object engaged only enhances the engagement.

In accordance with the general features of this invention, there is provided an arcuate or circular ornamental member having a ring of concealed resilient fingers in position to project diagonally rearward from surface of the object engaged; said fingers being so constructed as to enable the member to be easily snapped on the object, but to render it difficult thereafter for the member to be removed.

Other objects and features of this invention will more fully appear from the following detailed description, taken in connection with the accompanying drawing, which illustrates several embodiments thereof, and in which Figure 1 is a side view of a Lyon type of spare tire cover provided with an emblem held on the cover by means embodying the features of this invention;

Figure 2 is an enlarged fragmentary sectional view taken on the line II—II of Figure 1, illustrating the cross-sectional shape of the emblem and the means for holding it in place on the side plate of the cover;

Figure 3 is a rear view of the emblem showing the ring of teeth thereon;

Figure 4 is an enlarged sectional view taken through the emblem and a portion of the object engaged, which sectional view is similar to a portion of Figure 2.

In the drawing:

The tire cover illustrated in the accompanying drawing may be of any suitable or conventional construction, but is illustrated as being of the Lyon type, or in other words, of the type shown in Patent No. 1,807,697 of George Albert Lyon. This cover embodies a drum-like side plate 10 for disposition over the outer side of the spare tire 13 and wheel 14. Associated with the outer periphery of this plate 10 is a resilient split rim 11 which is disposed in retaining engagement with the plate 10. The outer margin of this rim 11 engages a cushioning bead on the outer edge of the plate 10, and the inner margin of this rim 11 engages the rear side of the tire tread.

I propose, in accordance with the features of this invention, to provide a novel and simple means for securing an emblem to a part of the tire cover, such for example as the side plate 10. This emblem is designated generally by the reference character 16, and may have any suitable ornamentation thereon, as for example the name or trade-mark of the automobile manufacturer. The emblem is in the form of an arcuate cap, and more specifically it is illustrated as being substantially of elliptical shape. It is of course to be understood that this cap may be of any other desired shape, such for example, as a circular shape.

The cap 16 has its outer peripheral edge or margin turned back upon itself and formed into a plurality of spaced diagonal teeth 17. These teeth are arranged to extend diagonally outward relative to the direction of attachment. In the present instance, I have illustrated the part that is engaged by the teeth as being in the form of a protuberance or projection 15 in the side plate 10.

In the application of this emblem to the protuberance 15, the cap is pressed inwardly over the protuberance, so that the teeth 17 are brought into engagement with the outer surface of this protuberance 15. These teeth, by reason of their angle with reference to the cap 16 and the protuberance 15, slide easily over the surface of the protuberance into gripping engagement therewith. Any tendency, however, to dislodge the teeth 17 from engagement with the part 15 results only in the enhancement of the gripping or biting engagement.

The cap may be made from any suitable material, such for example as metallic sheet. I have obtained excellent results by making it from sheet steel, although good results can be obtained by the use of other materials possessing sufficient resiliency to enable the teeth properly to grip and engage the object covered.

I, of course, desire it understood that while I have illustrated my invention as being applied in two different applications, the invention is not to be thus limited, but only insofar as defined by the scope and spirit of the appended claim.

I claim as my invention:

In combination, a wheel covering element having a smooth cylindrical surface, and a cap-like emblem of similar cylindrical contour attachable to said element by pressing the emblem over said surface, said emblem having a series of underturned teeth for engaging said smooth cylindrical surface, said teeth sloping outwardly at an acute angle in position to bite into said smooth cylindrical surface upon a tendency to dislodge the emblem, and said emblem being held on said surface solely by said teeth.

GEORGE ALBERT LYON.